(12) United States Patent
Wacquant

(10) Patent No.: US 11,488,399 B2
(45) Date of Patent: Nov. 1, 2022

(54) VEHICLE DRIVER MONITORING SYSTEM FOR DETERMINING DRIVER WORKLOAD

(71) Applicant: Magna Electronics Inc., Auburn Hills, MI (US)

(72) Inventor: Sylvie Wacquant, Mainhausen (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 404 days.

(21) Appl. No.: 16/718,860

(22) Filed: Dec. 18, 2019

(65) Prior Publication Data

US 2020/0202151 A1 Jun. 25, 2020

Related U.S. Application Data

(60) Provisional application No. 62/781,802, filed on Dec. 19, 2018.

(51) Int. Cl.
| | | |
|---|---|---|
| *G06V 20/59* | (2022.01) | |
| *G06V 40/16* | (2022.01) | |
| *G06V 40/10* | (2022.01) | |
| *G06V 40/20* | (2022.01) | |
| *B60R 11/04* | (2006.01) | |
| *G05B 13/02* | (2006.01) | |
| *B60R 11/02* | (2006.01) | |
| *B60R 11/00* | (2006.01) | |

(52) U.S. Cl.
CPC ........ *G06V 20/597* (2022.01); *B60R 11/0247* (2013.01); *B60R 11/04* (2013.01); *G05B 13/0265* (2013.01); *G06V 40/10* (2022.01); *G06V 40/16* (2022.01); *G06V 40/174* (2022.01); *G06V 40/20* (2022.01); *B60R 2011/0003* (2013.01)

(58) Field of Classification Search
CPC ............... B60R 11/0247; B60R 11/04; B60R 2011/0003; G05B 13/0265; G06V 20/597; G06V 40/10; G06V 40/103; G06V 40/16; G06V 40/174; G06V 40/20
USPC ........................................................ 434/66
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 6,693,517 B2 | 2/2004 | McCarthy et al. |
| 7,038,577 B2 | 5/2006 | Pawlicki et al. |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 10,071,687 B2 | 9/2018 | Ihlenburg et al. |
| 10,099,614 B2 | 10/2018 | Diessner |
| 10,850,746 B2 * | 12/2020 | Marti ................... B60K 35/00 |

(Continued)

*Primary Examiner* — Christopher S Kelley
*Assistant Examiner* — Kathleen M Walsh
(74) *Attorney, Agent, or Firm* — Honigman LLP

(57) ABSTRACT

A method for monitoring a driver of a vehicle includes receiving, at a control, driver information based on the driver of the vehicle. A distraction workload of the driver is determined by the control based on the driver information and a driving workload of the driver is estimated by the control based on the driver information. An amount of driver attention is determined by the control based on the determined distraction workload and the determined driving workload.

17 Claims, 7 Drawing Sheets

(56) References Cited

U.S. PATENT DOCUMENTS

| | | | |
|---|---|---|---|
| 10,963,741 B2* | 3/2021 | Ambeck-Madsen | G06K 9/627 |
| 2003/0181822 A1* | 9/2003 | Victor | A61B 5/1114 |
| | | | 600/558 |
| 2004/0113799 A1* | 6/2004 | Geisler | G06Q 10/00 |
| | | | 340/576 |
| 2005/0073136 A1* | 4/2005 | Larsson | A61B 5/11 |
| | | | 180/272 |
| 2007/0063854 A1* | 3/2007 | Zhang | B60W 40/09 |
| | | | 340/576 |
| 2007/0124027 A1* | 5/2007 | Betzitza | B60W 40/09 |
| | | | 701/1 |
| 2007/0182529 A1* | 8/2007 | Dobler | B60K 28/066 |
| | | | 340/438 |
| 2010/0033333 A1* | 2/2010 | Victor | G06V 20/597 |
| | | | 340/576 |
| 2012/0062743 A1 | 3/2012 | Lynam et al. | |
| 2012/0203424 A1* | 8/2012 | Filev | B60W 50/00 |
| | | | 701/36 |
| 2012/0218412 A1 | 8/2012 | Dellantoni et al. | |
| 2013/0222592 A1 | 8/2013 | Gieseke | |
| 2014/0218529 A1 | 8/2014 | Mahmoud et al. | |
| 2014/0336876 A1 | 11/2014 | Gieseke et al. | |
| 2014/0375476 A1 | 12/2014 | Johnson et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0124096 A1 | 5/2015 | Koravadi | |
| 2015/0158499 A1 | 6/2015 | Koravadi | |
| 2015/0232030 A1 | 8/2015 | Bongwald | |
| 2015/0251599 A1 | 9/2015 | Koravadi | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0036917 A1 | 2/2016 | Koravadi et al. | |
| 2016/0137126 A1 | 5/2016 | Fursich et al. | |
| 2016/0210853 A1 | 7/2016 | Koravadi | |
| 2018/0009442 A1* | 1/2018 | Spasojevic | B60K 28/066 |
| 2018/0231976 A1 | 8/2018 | Singh | |
| 2019/0232966 A1* | 8/2019 | Prakah-Asante | G08B 21/06 |

* cited by examiner

| Driving Workload | | Distraction Workload | | Driver Attention Estimation Module: calibration output function | Driver Attention Estimation Output State |
|---|---|---|---|---|---|
| state | weight | state | weight | | |
| $I_{driWo}$ | $W_{driWo}$ | $I_{distWo}$ | $W_{distWo}$ | $h(MaxWorkload-(W_{driWo} * I_{driWo} + W_{distWo} * I_{distWo})) < 0$ | $g(0)\%$ |
| $I_{driWo}$ | $W_{driWo}$ | $I_{distWo}$ | $W_{distWo}$ | $h(MaxWorkload-(W_{driWo} * I_{driWo} + W_{distWo} * I_{distWo})) >= 0$ | $g(MaxWorkload-(W_{driWo} * I_{driWo} + W_{distWo} * I_{distWo}))\%$ |

FIG. 6A

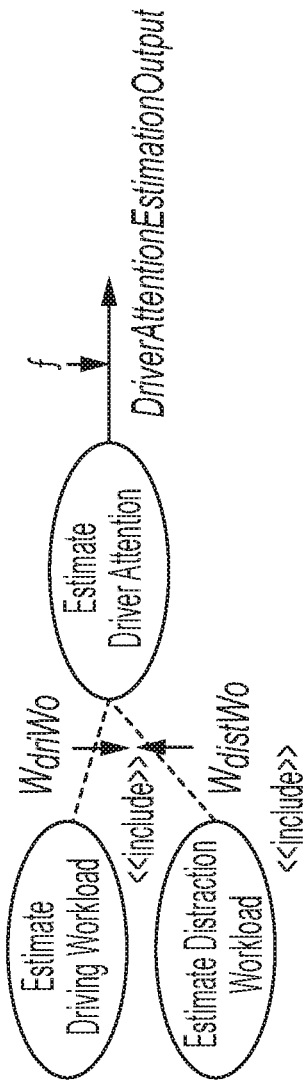

FIG. 6B

VEHICLE DRIVER MONITORING SYSTEM FOR DETERMINING DRIVER WORKLOAD

CROSS REFERENCE TO RELATED APPLICATION

The present application claims the filing benefits of U.S. provisional application Ser. No. 62/781,802, filed Dec. 19, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance method or system or driver monitoring method or system for a vehicle that may utilize one or more cameras to capture image data representative of images exterior and interior of the vehicle. The method includes estimating a distraction workload of the driver and estimating a driving workload of the driver. Based on the distraction workload and the driving workload (and optionally based in part on a determined maximum workload), the method includes determining an amount of driver attention.

Thus, the present invention gathers an estimation of the driver's current physical and mental state, which includes, for example, the driver's physical position and driving attention along with input from a plurality of signals available in a vehicle (e.g., a camera system).

These and other objects, advantages, purposes and features of the present invention will become apparent upon review of the following specification in conjunction with the drawings.

BRIEF DESCRIPTION OF THE DRAWINGS

FIG. 6A is an exemplary table for determining driver attention;

FIG. 6B is a flow chart for determining driver attention; and

DESCRIPTION OF THE PREFERRED EMBODIMENTS

A vehicle vision system and/or driver assist system and/or driver monitoring system and/or alert system operates to capture images exterior and interior of the vehicle and may process vehicle data and the captured image data to display images and to detect objects at or near the vehicle and in the predicted path of the vehicle, such as to assist a driver of the vehicle in maneuvering the vehicle or monitor the workload of the driver. The driver monitoring system includes an image processor or image processing system that is operable to receive image data from one or more cameras and vehicle sensor signals and provide an output to a display device for displaying images representative of the captured image data. Optionally, the driver monitoring system may provide display, such as a rearview display or a top down or bird's eye or surround view display or the like.

Figure 1:
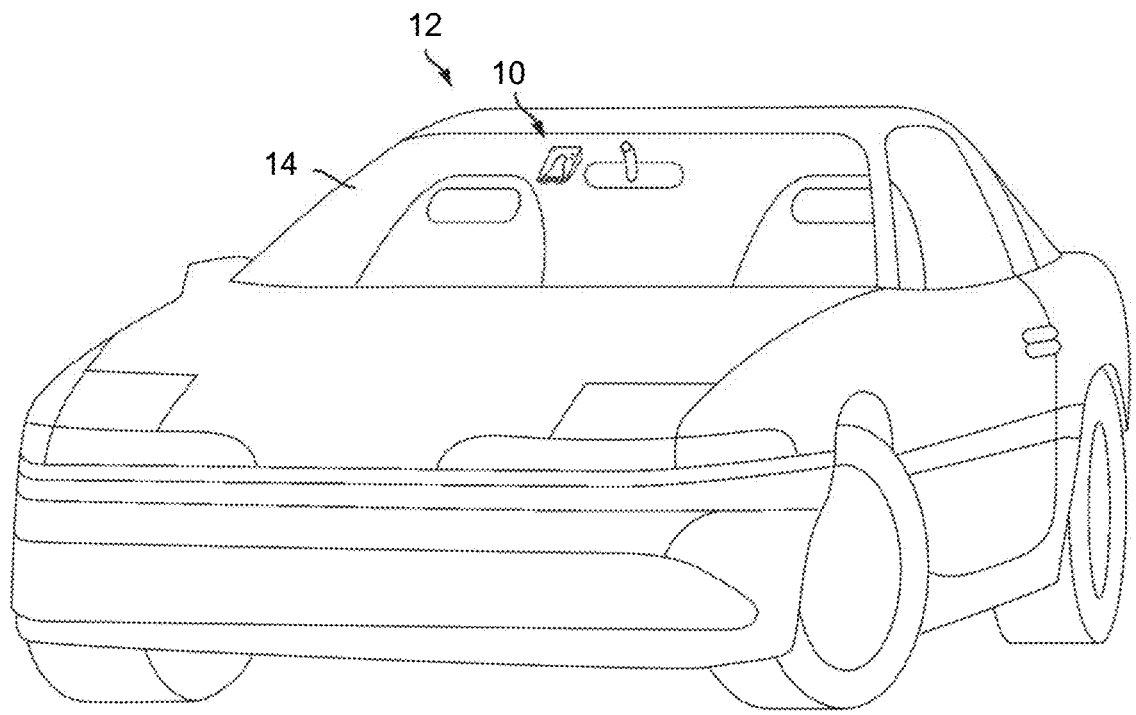
FIG. 1 is a perspective view of a vehicle with a driver monitoring system that incorporates at least a forward camera module.

Referring now to the drawings and the illustrative embodiments depicted therein, a driver monitoring system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. Optionally, the system may include multiple interior viewing imaging sensors or cameras, such as a camera with a field of view of the driver's head and torso and/or a camera with a field of view of one or more passengers. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The driver monitoring system 10 may also include an interior camera positioned above the steering wheel and another interior camera positioned above a rearview mirror assembly. The driver monitoring system 10 includes a control or electronic control unit (ECU) disposed at the vehicle, with the ECU including electronic circuitry and associated software. The circuitry may include a data processor for processing data provided to the ECU. The control is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
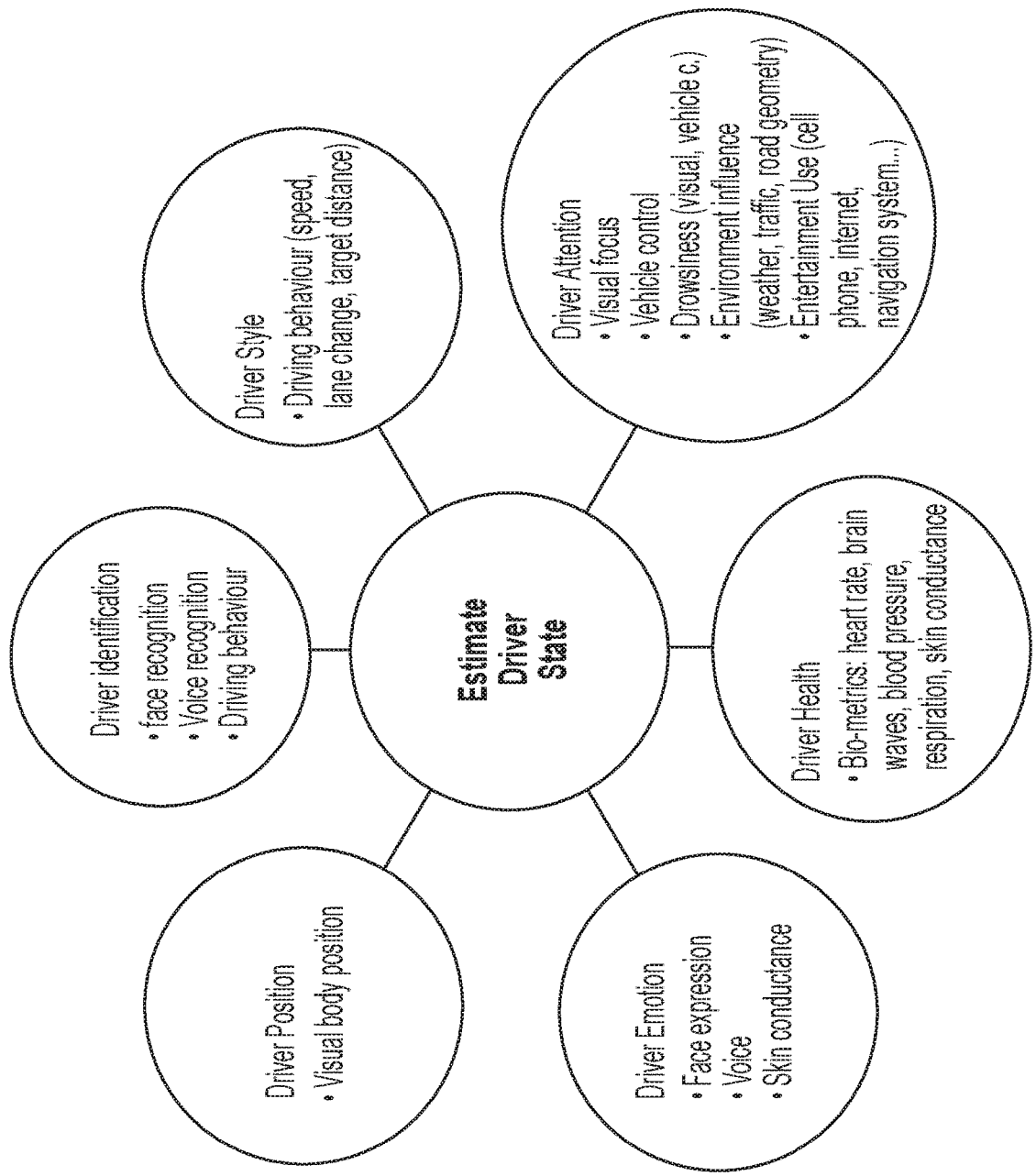
FIG. 2 is a block diagram illustrating inputs used to estimate a current driver state.
Figure 3:
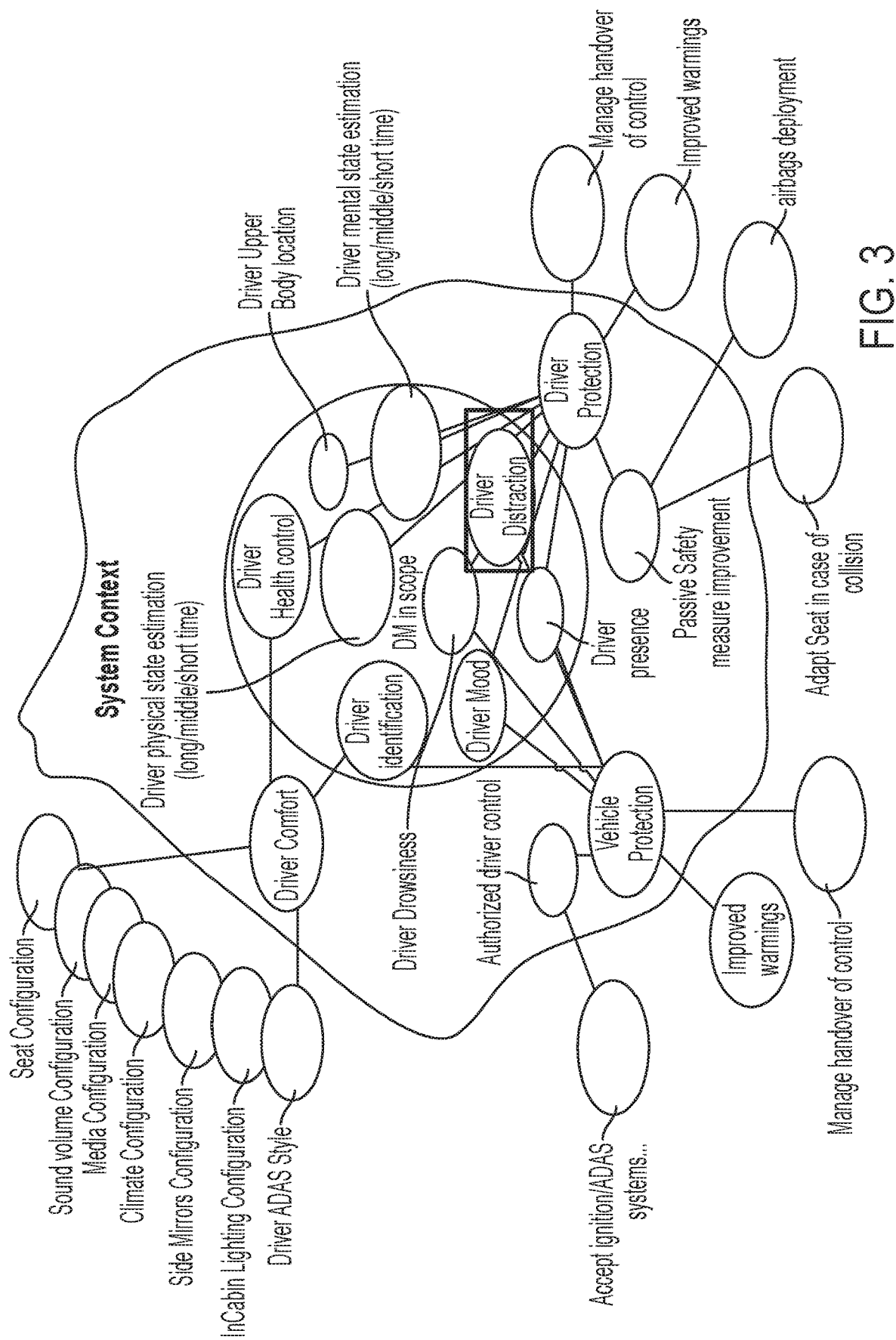
FIG. 3 is a block diagram illustrating a system context of the driver monitoring system.

The present invention provides a driver monitoring method or system that measures, estimates, or otherwise computes the attention of the driver based on evaluation or estimation of the driver workload and distraction workload or level. Because a system cannot "open the brain" of a driver, the real-time system investigates the driver's physical and mental conditions based on processing of driver and driver context information. As shown in FIG. 2 and FIG. 3, the system estimates a state of the driver based on a number of inputs. For example, the system may identify the driver (e.g., by face recognition using cameras, by voice recognition using microphones, or via recognized driving behavior). The system may also incorporate the style of the driver through measured driving behavior (e.g., speed, braking, accelerating, lane changing, target distances, etc.). The system may also include the driver's position or posture (i.e., the visual body position of the driver), the emotions of the driver (e.g., through facial expressions, voice, or skin conductance), and the health of the driver (e.g., through biometrics such as heart rate, brain waves, blood pressure, respiration, and skin conductance). Additionally, driver focus or attention may be estimated or measured through, for example, visual focus, vehicle control, drowsiness (estimated visually or through vehicle controls), environment influences (e.g., weather information, traffic information, infrastructure information, road conditions and geometry, visibility information), climate control usage, audio data captured by a microphone, and entertainment use (cell phone, internet, navigation, audio volume, etc.).

In some examples, the system may also monitor one or more passengers of the vehicle based on a portion of the same information. For example, the system may determine an amount or degree of passenger attention based on image data captured by an interior camera of the vehicle. Additionally, the passenger monitoring may refine the driver estimations. For example, if the system determines that a passenger of the vehicle is adjusting the radio (e.g., via an interior camera), the system may not adjust the driver's distraction level.

Figure 4:
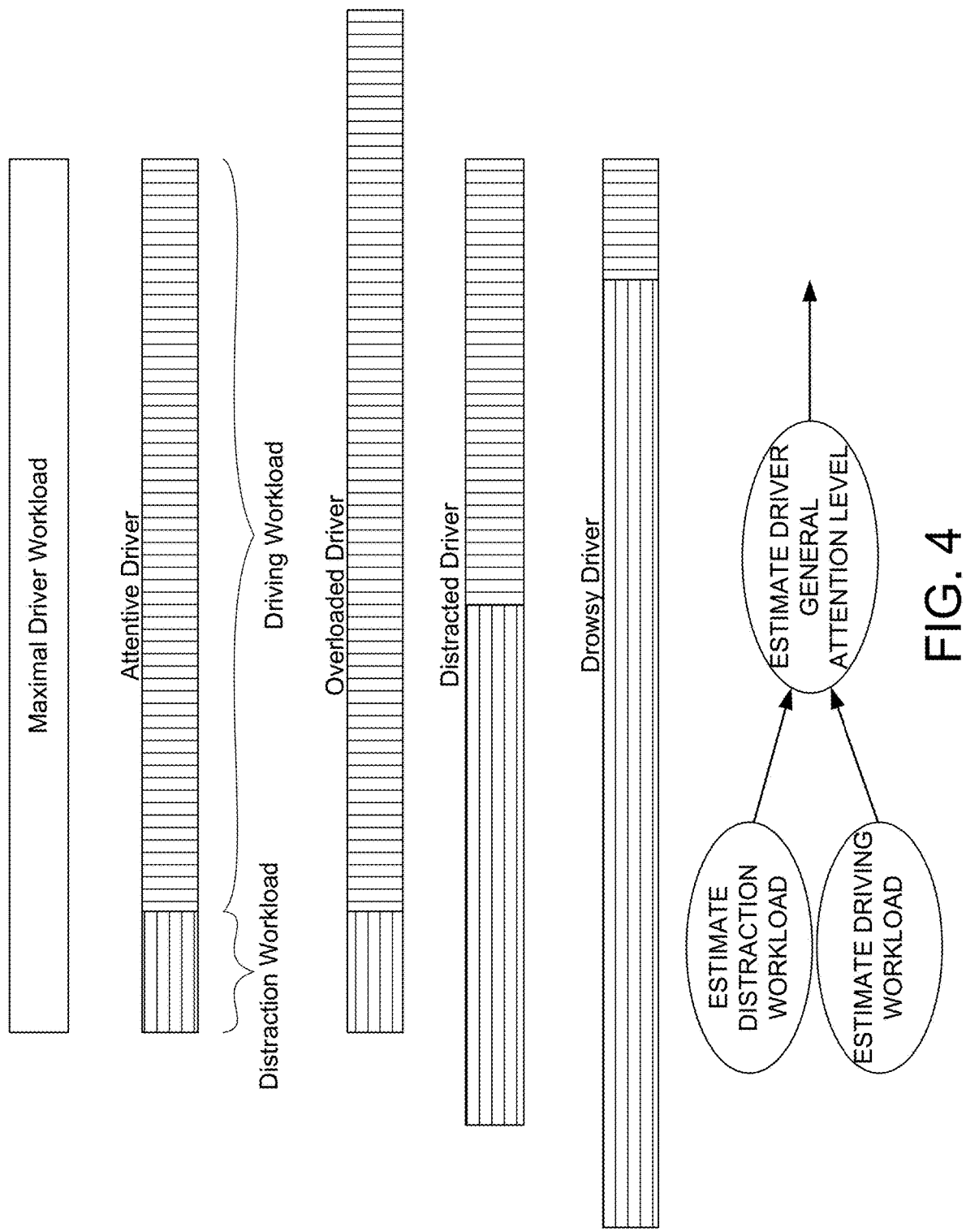
FIG. 4 is a chart illustrating driver classifications of the driver monitoring system.

Referring now to FIG. 4, the driver monitoring system may estimate an amount of driver attention by determining a maximum driver workload (such as a maximum workload that should be attributed to a driver based on driving conditions, driver information and/or the like) and then estimating a distraction workload of the driver and a driving workload of the driver. The maximum driver workload may be initialized to a predetermined value. The predetermined value may be adjusted, for example, based on driver information (e.g., driver age, driver experience, etc.). The sum of the driving workload and the distraction workload should not exceed the determined maximum workload for the driver.

Figure 5:
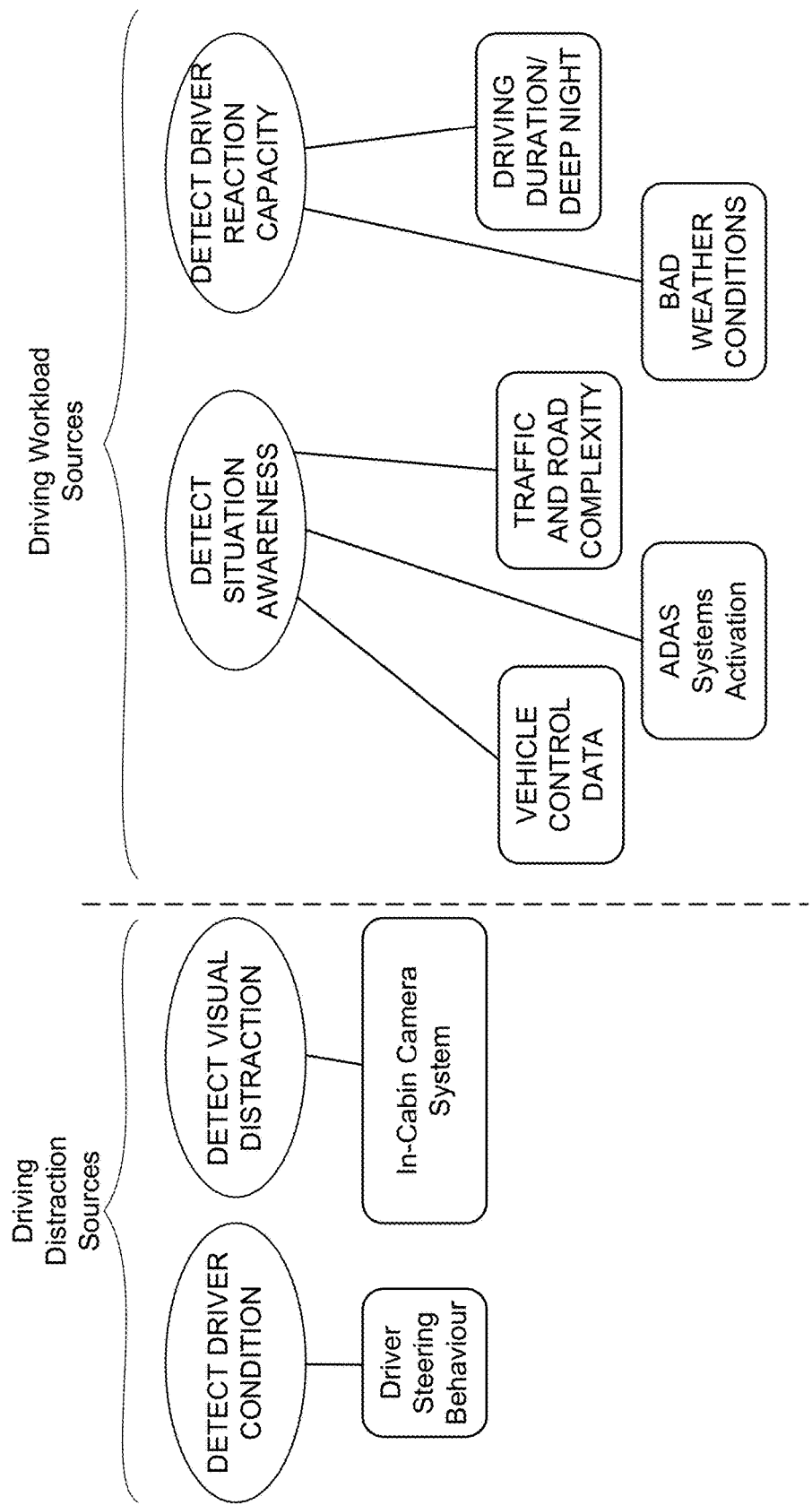
FIG. 5 is a chart illustrating driver information inputs to the driver monitoring system.

As shown in FIG. 5, the distraction workload may be estimated by processing, via the control, inputs from the media system (e.g., volume, channel changes, navigation usage, internet usage, etc.) detect the driver condition (e.g., via the driver steering behavior), and/or through detecting visual distraction (e.g., via the in-cabin camera system, gaze direction when driving targets are detected, etc.). The driver workload may be estimated by processing, via the control or processor, control inputs and inputs from the in-cabin camera system (e.g., to detect visual driving). The drowsiness of the driver may be measured through, for example, facial expressions (closing eyes, yawning, etc.) and steering profile (i.e., a "coffee cup system"). The driver workload may also incorporate the situation awareness of the driver or required by the driver. For example, the system may use vehicle control data, advanced driver-assistance systems (ADAS) inputs/outputs, and traffic and road complexity (e.g., measured via cameras, radar, GPS, and the like). A reaction capacity of the driver may also be detected via, for example, measured weather conditions (via sensors or weather reports for the area), driving duration, and driving times (e.g., late at night).

FIG. 6A illustrates a table providing exemplary equations for calculating the amount of driver attention. Both the driving workload and the distraction workload may be weighted (i.e., $W_{driWo}$ and $W_{distWo}$). The weights may start at a default value that is different or equal (e.g., each may start at 0.5). The weights may be updated through testing or through use as the driver operates the vehicle. The weights may change due to conditions (e.g., road or weather conditions) or due to a particular driver or driver condition. That is, the weights or weighting factors or values may be associated with a specific driver based on behavior observed during previous trips. As shown in FIG. 6A, determining the amount of driver attention may include subtracting the sum of the weighted driving workload and the weighted distraction workload from the maximum workload. The amount of driver attention may be expressed as a percentage between zero and one hundred. FIG. 6B provides a flow chart illustrating the combination of driving workload and distraction workload to determine the driver attention.

Figure 7:
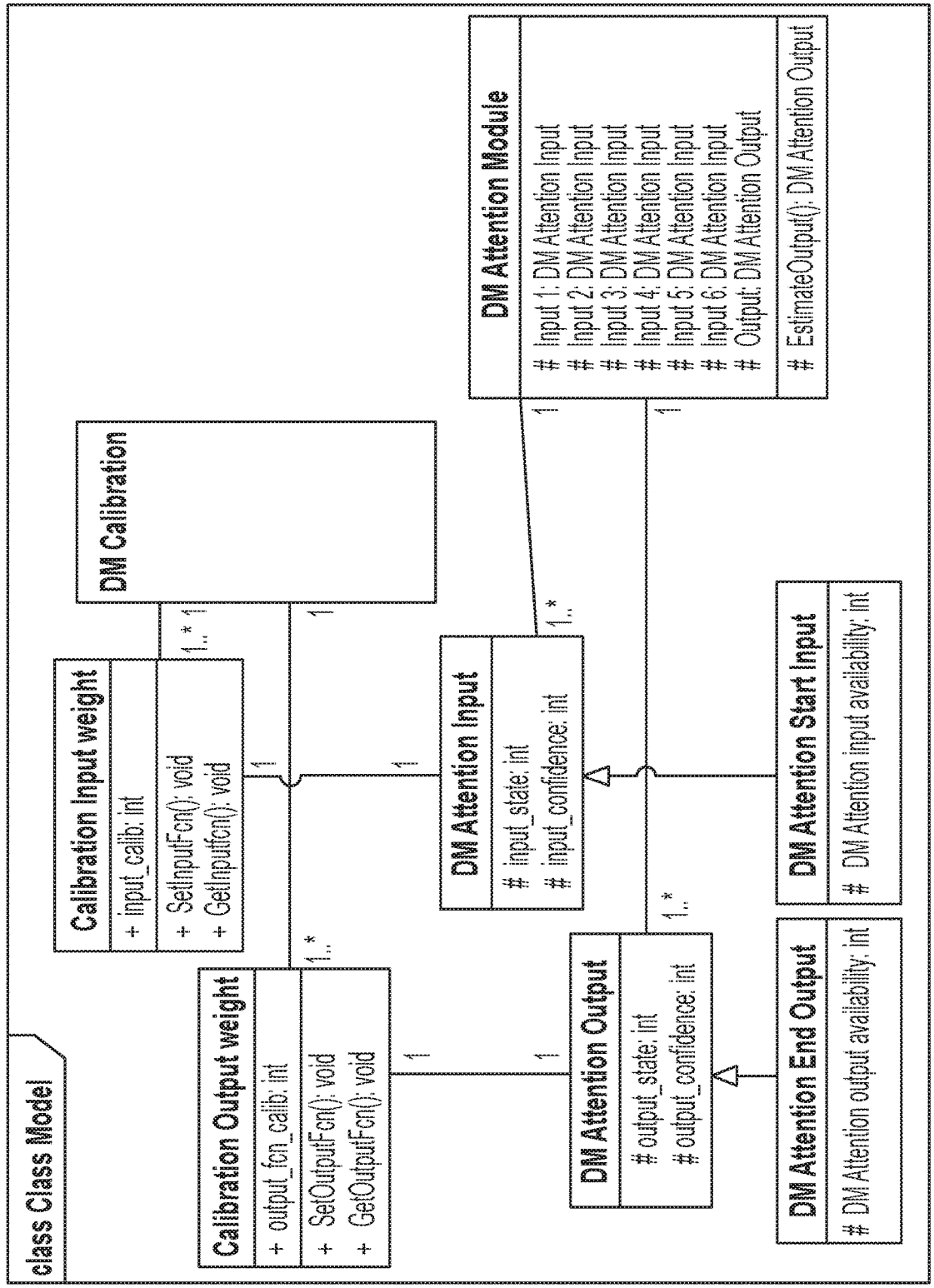
FIG. 7 is a block diagram illustrating an exemplary module construction of the driver monitoring system.

Referring now to FIG. 7, the driver monitoring system may include a number of modules. Each module may accept any number of inputs, and each input includes a current state of the input and a confidence of the input. Each input may also include an availability value (i.e., having a consequence on following confidence). Each input may also include a calibration input weight. The calibration input weights may being at a default value that may dynamically change in response to testing or use. Each module also includes at least one output. Each output contains a state and a confidence of the state. Each output may include a calibration output function that may be initially set to a default function that dynamically changes during testing or operation.

Thus, the present invention uses the notion that increases in the difficulty of one task will result in a loss of performance of another task (i.e., attention is finite). To this end, the present invention estimates the driver attention general level with the distribution of driving and distraction workload. If the driving task's complexity increases (e.g., complex surroundings, weather situations, hour context, etc.), the driver may become overloaded and his or her attention will be lowered. When the driver is concentrated on the road, the system determines the presence of a fully attentive driver. If the driver is highly distracted (e.g., cell phone use), the system measures a lowered or reduced attention. When the driver is drowsy (via the driver steering behavior or via the in-cabin camera system), the system measures a lowered or reduced attention. In all of the described cases, the system assigns a confidence to the inputs (and an availability of the inputs). The system includes calibration elements that may be adjusted in response to testing or use. Additionally, future outputs may be predicted through the use of machine learning algorithms adjusting the calibration elements.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like (e.g., any object posing a risk of collision or danger for the vehicle, the passengers, or the object itself) in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle. They system may also check if the awareness of the driver is set in the direction of the detected object or vehicle or hazardous condition and, when the system determines the driver's awareness is not in the direction of the detected object, the system may take control of the vehicle autonomously (e.g., braking and/or steering to avoid the object). The system may determine a risk level and only take control when the risk level exceeds a risk threshold.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412;

US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize aspects of head and face direction and position tracking systems and/or eye tracking systems and/or gesture recognition systems and/or driver identify and/or emotion recognition systems and/or health characteristics systems and/or voice characteristics systems and/or driving behavior systems. Such head and face direction and/or position tracking systems and/or eye tracking systems and/or gesture recognition systems may utilize aspects of the systems described in U.S. Publication Nos. US-2016-0137126; US-2015-0352953; US-2015-0296135; US-2015-0294169; US-2015-0232030; US-2015-0022664; US-2015-0015710; US-2015-0009010 and/or US-2014-0336876, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for monitoring a driver of a vehicle, the method comprising:
    disposing a control at a vehicle, the control comprising electronic circuitry and associated software, wherein the electronic circuitry comprises a data processor;
    receiving, at the control, driver information pertaining to a driver of the vehicle;
    at least in part responsive to processing at the control of the received driver information, estimating a distraction workload of the driver based at least in part on the received driver information, wherein the distraction workload is estimated based at least in part on at least one selected from the group consisting of (i) vehicle entertainment information, (ii) driver condition information and (iii) visual distraction information;
    at least in part responsive to processing at the control of the received driver information, estimating a driving workload of the driver based at least in part on the received driver information, wherein the driving workload is estimated based at least in part on at least one selected from the group consisting of (i) a visual driving condition, (ii) a traffic condition and (iii) a driver reaction capacity;
    at least in part responsive to processing at the control of the estimated distraction workload and the estimated driving workload, determining an amount of driver attention based on the estimated distraction workload and based on the estimated driving workload; and
    wherein determining the amount of driver attention comprises weighting the driving workload and the distraction workload based at least in part on driving conditions, and wherein an initial driving workload weight and an initial distraction workload weight are the same, and wherein the initial driving workload weight and the initial distraction workload weight are updated responsive to tendencies extracted from data collected from other vehicles.

2. The method of claim 1, comprising classifying, by the control, the driver as at least one selected from the group consisting of overloaded, attentive, distracted and drowsy.

3. The method of claim 1, wherein the driver information comprises vehicle entertainment information, driver condition information and visual distraction information, and wherein the distraction workload is estimated based at least in part on the vehicle entertainment information, the driver condition information and the visual distraction information.

4. The method of claim 1, wherein the driver information comprises visual driving conditions, traffic conditions and driver reaction capacity, and wherein the driving workload is estimated based at least in part on the visual driving conditions, the traffic conditions and the driver reaction capacity.

5. The method of claim 1, wherein the initial driving workload weight and the initial distraction workload weight are updated during operation of the vehicle.

6. The method of claim 1, comprising determining, at least in part responsive to processing at the control of the received driver information, a maximum workload of the driver based at least in part on the received driver information, and wherein determining the amount of driver attention comprises subtracting a sum of the weighted driving workload and the weighted distraction workload from the maximum workload.

7. The method of claim 6, wherein the determined amount of driver attention comprises a percentage value between zero and one hundred.

8. The method of claim 1, wherein the driver information is weighted by confidence coefficients.

9. The method of claim 1, wherein the driver information comprises at least one selected from the group consisting of driver position, driver identification, driver style, driver attention, driver health and driver emotion.

10. The method of claim 1, comprising processing, at the control, received passenger information based on one or more passengers of the vehicle and adjusting, via the control, the determined amount of driver attention based at least in part on the received passenger information.

11. The method of claim 10, wherein processing passenger information comprises processing, at the control, image data captured by an interior camera of the vehicle.

12. The method of claim 1, wherein the received driver information comprises at least one selected from the group consisting of (i) braking behavior, (ii) acceleration behavior, (iii) lane keeping behavior, (iv) entertainment console usage, (v) climate control usage, (vi) image data captured by an interior camera of the vehicle and (vii) audio data captured by an interior microphone of the vehicle.

13. The method of claim 1, wherein the received driver information comprises vehicle environmental information, and wherein the vehicle environmental information comprises at least one selected from the group consisting of (i) traffic information, (ii) infrastructure information, (iii) weather information and (iv) visibility information.

14. The method of claim 1, comprising determining, via the control, a maximum workload of the driver based at least in part on the received driver information, and determining, via the control, the amount of driver attention based in part on the determined maximum workload of the driver.

15. A method for monitoring a driver of a vehicle, the method comprising:
    disposing a control at a vehicle, the control comprising electronic circuitry and associated software, wherein the electronic circuitry comprises a data processor;
    receiving, at the control, driver information pertaining to a driver of the vehicle;
    at least in part responsive to processing at the control of the received driver information, determining a maximum workload of the driver based at least in part on the received driver information;

at least in part responsive to processing at the control of the received driver information, estimating a distraction workload of the driver based at least in part on the received driver information, wherein the distraction workload is estimated based at least in part on at least one selected from the group consisting of (i) vehicle entertainment information, (ii) driver condition information, (iii) visual distraction information;

at least in part responsive to processing at the control of the received driver information, estimating a driving workload of the driver based at least in part on the received driver information, wherein the driving workload is estimated based at least in part on at least one selected from the group consisting of (i) a visual driving condition, (ii) a traffic condition, and (iii) a driver reaction capacity;

at least in part responsive to processing at the control of the estimated distraction workload and the estimated driving workload, determining an amount of driver attention based on the estimated distraction workload, the estimated driving workload and the maximum workload;

processing, at the control, received passenger information based on one or more passengers of the vehicle and adjusting, via the control, the determined amount of driver attention based at least in part on the received passenger information;

wherein determining the amount of driver attention comprises weighting the driving workload and the distraction workload based at least in part on driving conditions, and wherein an initial driving workload weight and an initial distraction workload weight are the same; and updating the initial driving workload weight and the initial distraction workload weight responsive to tendencies extracted from data collected from other vehicles.

16. A method for monitoring a driver of a vehicle, the method comprising:

disposing a control at a vehicle, the control comprising electronic circuitry and associated software, wherein the electronic circuitry comprises a data processor;

receiving, at the control, driver information pertaining to a driver of the vehicle;

at least in part responsive to processing at the control of the received driver information, determining a maximum workload of the driver based at least in part on the received driver information;

at least in part responsive to processing at the control of the received driver information, estimating a distraction workload of the driver based at least in part on the received driver information, wherein the distraction workload is estimated based at least in part on at least one selected from the group consisting of (i) vehicle entertainment information, (ii) driver condition information and (iii) visual distraction information;

at least in part responsive to processing at the control of the received driver information, estimating a driving workload of the driver based at least in part on the received driver information, wherein the driving workload is estimated based at least in part on at least one selected from the group consisting of (i) a visual driving condition, (ii) a traffic condition and (iii) a driver reaction capacity;

weighting, by the control, the driving workload and the distraction workload based on previous driving behavior of the driver and on driving conditions, and wherein an initial driving workload weight and an initial distraction workload weight are the same;

updating the initial driving workload weight and the initial distraction workload weight responsive to tendencies extracted from data collected from other vehicles; and at least in part responsive to processing at the control of the estimated distraction workload and the estimated driving workload, determining an amount of driver attention by subtracting a sum of the weighted driving workload and the weighted distraction workload from the maximum workload.

17. The method of claim 16, wherein the driver information is weighted by confidence coefficients.

* * * * *